(12) United States Patent
Hamano

(10) Patent No.: US 10,412,330 B2
(45) Date of Patent: Sep. 10, 2019

(54) IMAGE CAPTURE APPARATUS AND METHOD FOR CONTROLLING THE SAME

(71) Applicant: CANON KABUSHIKI KAISHA, Tokyo (JP)

(72) Inventor: Hideyuki Hamano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 15/222,175

(22) Filed: Jul. 28, 2016

(65) Prior Publication Data

US 2017/0034463 A1    Feb. 2, 2017

(30) Foreign Application Priority Data

Jul. 31, 2015    (JP) .................................. 2015-152694

(51) Int. Cl.
*H04N 9/04* (2006.01)
*H04N 5/232* (2006.01)
*H04N 5/369* (2011.01)

(52) U.S. Cl.
CPC ....... *H04N 5/3696* (2013.01); *H04N 5/23212* (2013.01); *H04N 5/23296* (2013.01); *H04N 9/045* (2013.01)

(58) Field of Classification Search
CPC .. H04N 5/3696; H04N 9/045; H04N 5/23296; H04N 5/23212
See application file for complete search history.

(56) References Cited

U.S. PATENT DOCUMENTS 5,467,163 A    11/1995  Uchiyama
5,589,909 A    12/1996  Kusaka
2007/0206940 A1 *  9/2007  Kusaka ............. H04N 5/23212
                                                    396/128
2013/0076970 A1 *  3/2013  Kishi .................. H04N 5/3696
                                                    348/349
2013/0100338 A1 *  4/2013  Iwasaki ............... H04N 5/3696
                                                    348/353

(Continued)

FOREIGN PATENT DOCUMENTS

CN    102089696 A    6/2011
CN    103024264 A    4/2013

(Continued)

OTHER PUBLICATIONS

The above patent documents were cited in a British Office Action dated Oct. 18, 2017, which is enclosed, that issued in the corresponding U.K. Patent Application No. 1613038.7.

(Continued)

*Primary Examiner* — Jason A Flohre
(74) *Attorney, Agent, or Firm* — Cowan, Liebowitz & Latman, P.C.

(57) ABSTRACT

Regarding one or more pairs of image signals generated based on a signal obtained from an image sensor, a phase difference of the image signals is determined and a defocus amount is calculated based on the phase difference based on a correlation amount calculated while relatively shifting the positions of the one or more pairs of image signals. By using image signals whose detectable defocus amount range and defocus amount detection accuracies are different, the amount of correlation calculation for focus detection can be reduced in various defocused states of a subject for which focus detection is to be performed.

9 Claims, 10 Drawing Sheets

(56) References Cited

U.S. PATENT DOCUMENTS

| | | | | |
|---|---|---|---|---|
| 2014/0362278 | A1* | 12/2014 | Kawarada | H04N 5/23212 348/349 |
| 2014/0362279 | A1* | 12/2014 | Takeuchi | H04N 5/3696 348/349 |
| 2015/0222811 | A1* | 8/2015 | Kishi | H04N 5/3696 348/349 |

FOREIGN PATENT DOCUMENTS

| | | |
|---|---|---|
| JP | 2007-233034 A | 9/2007 |
| JP | 2009-271523 A | 11/2009 |
| JP | 2013-054261 A | 3/2013 |
| JP | 2013-072906 A | 4/2013 |
| JP | 2013-235047 A | 11/2013 |
| JP | 2014-239507 A | 12/2014 |
| JP | 2015-018205 A | 1/2015 |
| WO | 2014/155806 A | 10/2014 |

OTHER PUBLICATIONS

The above patent documents were cited in a British Search Report dated Feb. 1, 2017, which is enclosed, that issued in the corresponding U.K. Patent Application No. 1613038.7.

The above foreign patent documents were cited in the Mar. 22, 2019 Japanese Office Action, which is enclosed without an English Translation, that issued in Japanese Patent Application No. 2015152694.

The above foreign patent documents were cited in a Jun. 3, 2019 Chinese Office Action, with an English Translation, that issued in Chinese Patent Application No. 201610622613.8.

* cited by examiner

PLAN VIEW    a-a CROSS-SECTIONAL VIEW

FIG. 10

| | COMPRESSION RATE | NUMBER OF SETS OF DATA WITHIN FIELD OF VIEW (W) | NUMBER OF SETS OF SHIFT DATA (hmax) |
|---|---|---|---|
| FIRST CORRELATION COMPUTATION | 33% | W1 (= W2*1/3) | S1 |
| SECOND CORRELATION COMPUTATION | 100% (NOT COMPRESSED) | W2 | S2 |

IMAGE CAPTURE APPARATUS AND METHOD FOR CONTROLLING THE SAME

BACKGROUND OF THE INVENTION

Field of the Invention

The present invention relates to an image capturing apparatus and methods for controlling an image capturing apparatus.

Description of the Related Art

Image capture apparatuses (including image capture apparatuses embedded in electronic devices) such as digital cameras typically have an autofocus (AF) function. In terms of the autofocus function, there is a phase-difference detection method and a contrast detection method. Although conventionally the phase-difference detection method required an AF sensor that is separate from an image sensor, an autofocus function using the phase-difference detection method with signals obtained from the image sensor has been recently achieved and is called imaging-plane phase-difference AF.

The phase-difference detection method is advantageous in that both a defocus amount and a defocus direction can be simultaneously detected, but it is necessary to repeatedly execute correlation computation while changing a relative shift amount for a pair of image signals, resulting in a large amount of computation. To achieve high-speed focus detection and a reduction in power consumption, a proposal regarding a reduction in the amount of computation in the phase-difference detection method has been made.

Japanese Patent Laid-Open No. 2013-54261 discloses that correlation computation is performed while increasing a shift amount from a state in which the absolute value of the shift amount of a pair of image signals is small, and the correlation computation is ended at the point when the extremal value of the correlation amount is detected. With this configuration, it is more likely that the correlation computation can be ended with a smaller amount of computation than in the case of performing computation for the entire shift area.

However, with the method described in Japanese Patent Laid-Open No. 2013-54261, since the correlation computation is ended at the point when the extremal value for a subject having a small defocus amount is detected, there are cases where the intended subject of the photographer cannot be brought into focus.

SUMMARY OF THE INVENTION

The present invention has been made in view of this problem. In one aspect, the present invention provides an image capture apparatus capable of reducing the amount of correlation computation for focus detection in various defocused states of a subject for which focus detection is to be performed, and a method for controlling this image capture apparatus.

According to an aspect of the present invention, there is provided an image capture apparatus comprising: a generating unit configured to generate pairs of image signals based on a signal obtained from an image sensor; a phase difference determination unit configured to determine, for one or more of the pairs of image signals, a phase difference of the image signals based on a correlation amount calculated while relatively shifting positions of the one or more pairs of image signals; a calculating unit configured to calculate a defocus amount based on the phase difference determined by the phase difference determination unit; and a control unit configured to control a position of a focusing lens based on the defocus amount, wherein the generating unit is arranged to generate, as the pairs of image signals, signal pairs having different detectable defocus amount ranges and different defocus amount detection accuracies.

According to another aspect of the present invention, there is provided an image capture apparatus comprising: a generation unit configured to generate pairs of image signals based on a signal obtained from an image sensor; a phase difference determination unit configured to determine, for one or more of the pairs of image signals, a phase difference of the image signals based on a correlation amount calculated while relatively shifting positions of the one or more pairs of image signals; a calculating unit configured to calculate a defocus amount based on the phase difference determined by the phase difference determination unit; and a control unit configured to control a position of a focusing lens based on the defocus amount, wherein the generating unit is configured to generate the pairs of image signals by compressing a data volume of one pair of image signals obtained from the image sensor, at different compression rates.

According to a further aspect of the present invention, there is provided a method for controlling an image capture apparatus, the method comprising: generating pairs of image signals based on a signal obtained from an image sensor; determining, for one or more of the pairs of image signals, a phase difference of the image signals based on a correlation amount computed while relatively shifting positions of the one or more pairs of image signals; calculating a defocus amount based on the determined phase difference; and controlling a position of a focusing lens based on the defocus amount, wherein among the generated signal pairs, signal pairs are generated having a different detectable defocus amount ranges and different defocus amount detection accuracies.

According to another aspect of the present invention, there is provided a method for controlling an image capture apparatus, the method comprising: generating pairs of image signals based on a signal obtained from an image sensor; determining for one or more of the pairs of image signals, a phase difference of the image signals based on a correlation amount computed while relatively shifting positions of the one or more pairs of image signals; calculating a defocus amount based on the determined phase difference; and controlling a position of a focusing lens based on the defocus amount, wherein the pairs of image signals are generated by compressing a data volume of the or one pair of image signals obtained from the image sensor, at different compression rates.

According to a further aspect of the present invention, there is provided a non transitory machine-readable medium having stored thereon a computer program which upon execution causes an image capture apparatus to perform a method for controlling an image capture apparatus, the method comprising: generating pairs of image signals based on a signal obtained from an image sensor; determining, for one or more of the pairs of image signals, a phase difference of the image signals based on a correlation amount computed while relatively shifting, positions of the one or more pairs of image signals; calculating a defocus amount based on the determined phase difference; and controlling a position of a focusing lens based on the defocus amount, wherein among the generated signal pairs, signal pairs are generated having a different detectable defocus amount ranges and different defocus amount detection accuracies.

According to another aspect of the present invention, there is provided a non-transitory machine-readable medium having stored thereon a computer program which upon execution causes an image capture apparatus to perform a method for controlling an image capture apparatus, the method comprising: generating pairs of image signals based on a signal obtained from an image sensor; determining for one or more of the pairs of image signals, a phase difference of the image signals based on a correlation amount computed while relatively shifting positions of the one or more pairs of image signals; calculating a defocus amount based on the determined phase difference; and controlling a position of a focusing lens based on the defocus amount, wherein the pairs of image signals are generated by compressing a data volume of the or one pair of image signals obtained from the image sensor, at different compression rates.

Further features of the present invention will become apparent from the following description of embodiments with reference to the attached drawings.

BRIEF DESCRIPTION OF THE DRAWINGS

FIG. 10 is a diagram showing a setting of correlation computation according to the first embodiment.

DESCRIPTION OF THE EMBODIMENTS

Preferred embodiments of the present invention will now be described in detail in accordance with the accompanying drawings. Note that although embodiments in which the present invention is applied to a digital camera that serves as an image capture apparatus will be described below, the present invention is applicable to any electronic device that includes a camera having an autofocus function using a phase-difference detection method. Examples of such electronic devices include a personal computer, a tablet terminal, a game machine, a mobile phone, a robot, a drive recorder, a domestic appliance, and the like, but are not limited thereto.

First Embodiment

Description of Configuration—Lens Unit

Figure 1:
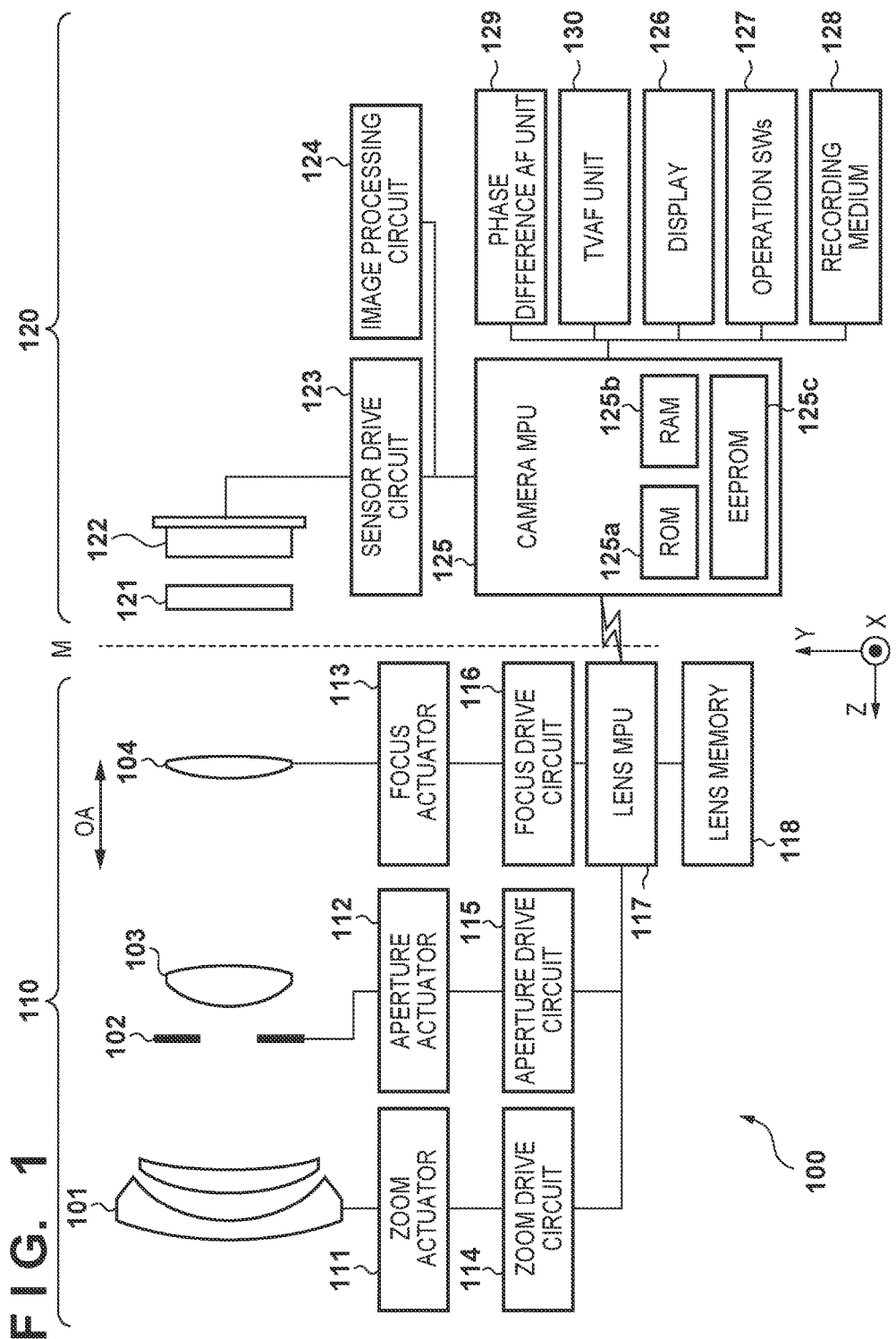
FIG. 1 is a diagram showing a functional configuration of a digital camera, which serves as an image capture apparatus according to an embodiment of the present invention.

FIG. 1 is a block diagram showing a functional configuration of a lens-interchangeable digital camera 100, which serves as an example of an image capture apparatus according to an embodiment of the present invention. The digital camera 100 according to this embodiment has a camera body 120 and a detachable lens unit 110. The lens unit 110 can be attached to the camera body 120 via a mount M, which is denoted by a dotted line. Note that the digital camera 100 does not have to be a lens-interchangeable type.

The lens unit 110 has an optical system (a first lens group 101, an aperture 102, a second lens group 103, and a focusing lens group (hereinafter referred to simply as a "focusing lens") 104, and a drive/control system.

The first lens group 101 is arranged at an end of the lens unit 110, and is held so as to be able to move in an optical axis direction OA. The aperture 102 has a function of adjusting light quantity at the time of imaging, and also functions as a mechanical shutter for controlling exposure time when taking a still image. The aperture 102 and the second lens group 103 can integrally move in the optical axis direction OA, and achieve a zoom function by moving in conjunction with the first lens group 101. The focusing lens 104 can also move in the optical axis direction OA, and the subject distance (focus distance) at which the lens unit 110 focuses is determined by the position of the focusing lens 104. Accordingly, the focus distance of the lens unit 110 can be adjusted by controlling the position of the focusing lens 104 in the optical axis direction OA.

The drive/control system has a zoom actuator 111, an aperture actuator 112, a focus actuator 113, a zoom drive circuit 114, an aperture drive circuit 115, a focus drive circuit 116, a lens MPU 117, and a lens memory 118.

The zoom drive circuit 114 drives the first lens group 101 and the second lens group 103 in the optical axis direction OA using the zoom actuator 111, and controls the angle of view of the optical system of the lens unit 110. The aperture drive circuit 115 drives the aperture 102 using the aperture actuator 112, and controls the opening diameter and opening and closing operations of the aperture 102. The focus drive circuit 116 drives the focusing lens 104 in the optical axis direction OA using, the focus actuator 113, and controls the focus distance of the optical system of the lens unit 110. The focus drive circuit 116 detects the current position of the focusing lens 104 using the focus actuator 113.

The lens MPU (processor) 117 performs all computation and control related to the lens unit 110, and controls the zoom drive circuit 114, the aperture drive circuit 115, and the focus drive circuit 116. The lens MPU 117 is connected to a camera MPU 125 through the mount M, and communicates commands and data therewith. For example, the lens MPU 117 detects the position of the focusing lens 104, and notifies the camera MPU 125 of lens position information in response to a request from the camera MPU 125. This lens position information includes information such as the position of the focusing lens 104 in the optical axis direction OA, the position in the optical axis direction OA and the diameter of an exit pupil in a state in which the optical system is not moving, and the position in the optical axis direction OA and the diameter of a lens frame that limits light beams of the exit pupil. The lens MPU 117 also controls the zoom drive circuit 114, the aperture drive circuit 115, and the focus drive circuit 116 in accordance with a request from the camera MPU 125. Optical information necessary for automatic focus detection is stored in advance in the lens memory 118. The camera MPU 125 controls operations of the lens unit 110 by executing a program stored in a nonvolatile memory embedded in the camera MPU 125 or the lens memory 118, for example.

Description of Configuration—Camera Body

The camera body 120 has an optical system (an optical low pass filter 121 and an image sensor 122) and a drive/control system. The optical system (the first lens group 101, the aperture 102, the second lens group 103, and the focusing lens 104) of the lens unit 110 and the optical low pass filter 121 of the camera body 120 constitute an imaging optical system that forms a subject optical image.

The optical low pass filter 121 reduces pseudo colors and moiré that occur in a captured image. The image sensor 122 is constituted by a CMOS image sensor and a peripheral circuit, for example, and typically has several to tens of millions of pixels arranged in rows and columns. The image sensor 122 according to this embodiment has a pupil division function, and can achieve imaging-plane phase-difference detection AF using output signals of the image sensor 122. The image processing circuit 124 generates image data for phase-difference AF and image data for display, recording, and contrast AF (hereinafter referred to as TVAF) from the output signals of the image sensor 122.

The drive/control system has a sensor drive circuit 123, the image processing circuit 124, the camera MPU 125, a display 126, an operation switch group 127, a recording medium 128, a phase-difference AF unit 129, and a TVAF unit 130.

The sensor drive circuit 123 controls the operations of the image sensor 122, and performs A/D conversion on an image signal that is output by the image sensor 122 and supplies the converted signal to the image processing circuit 124 and the camera MPU 125. The image processing circuit 124 performs general image processing that is performed in a digital camera, such as γ conversion, white balancing processing, color interpolation processing, and compression coding processing, on the image data supplied from the sensor drive circuit 123. The image processing circuit 124 generates image data for display, recording, and TVAF, and image data for phase-difference AF.

The camera MPU (processor) 125 performs all calculation and control related to the camera body 120, and controls the sensor drive circuit 123, the image processing circuit 124, the display 126, the operation switch group 127, the recording medium 128, the phase-difference AF unit 129, and the TVAF unit 130. The camera MPU 125 is connected to the lens MPU 117 via a signal line of the mount M, and communicates commands and data to the lens MPU 117. The camera MPU 125 requests the lens MPU 117 to acquire optical information regarding the lens unit 110 and the position of the focusing lens 104. The camera MPU 125 also requests the lens MPU 117 to drive the aperture 102, the focusing lens 104, and variable magnification lenses (the first lens group 101 and the second lens group 103). The camera MPU 125 has a ROM 125a in which a program for controlling operations of the ca body 120 is stored, a RAM 125b used for loading the program and storing variables, and an EEPROM 125c that stores setting values, GUI data, and the like.

The display 126 is constituted by an LCD and the like, and displays information regarding shooting modes, a preview image before shooting and an image for checking after shooting, a menu screen, an in-focus state display image (in-focus frame) at focus detection, an image indicating a detected subject (face frame), setting values, and the like. The operation switch (SW) group 127 is an input device group that includes a power switch, a release switch, a zoom operation switch, a shooting mode selection switch, a menu button, a direction key, switches such as an execution button, buttons, and the like. Note that if the display 126 is a touch panel display, a touch panel is also included in the operation switches. The recording medium 128 is a removable semiconductor memory or an embedded nonvolatile memory, for example, and stores data such as a still image, a moving image, and sound obtained by shooting.

The phase-difference AF unit 129 performs focus detection using the phase-difference detection method with the image data for phase-difference AF obtained by the image processing circuit 124. More specifically, the image processing circuit 124 generates, as the image data for phase-difference AF, data of an image formed by a light beam that passes through one of a pair of pupil areas within an exit pupil in the optical system of the lens unit 110 and an image formed by a light beam that passes through the other one of the pupil areas. The phase-difference AF unit 129 then detects a defocus amount based on a phase-difference of data of a pair of images that constitute the image data for phase-difference AF. Thus, the phase-difference AF unit 129 in this embodiment performs the phase-difference AF (imaging-plane phase-difference AF) based on the output of the image sensor 122, without using a dedicated AF sensor. Operations of the phase-difference AF unit 129 will be described later in detail.

The TVAF unit 130 performs focus detection (TVAF) using the contrast detection method based on image data for TVAF generated by the image processing circuit 124, or more specifically, an AF evaluation value (contrast information regarding the image data). In TVAF, the position of the focusing lens 104 in which the AF evaluation value is largest is detected as an in-focus position from images shot with the focusing lens 104 at different positions.

Thus, the digital camera 100 in this embodiment can execute both phase-difference AF and TVAF, and can selectively use them or use them in combination in accordance with a situation.

Description of Configuration—Image Sensor

Figure 2:
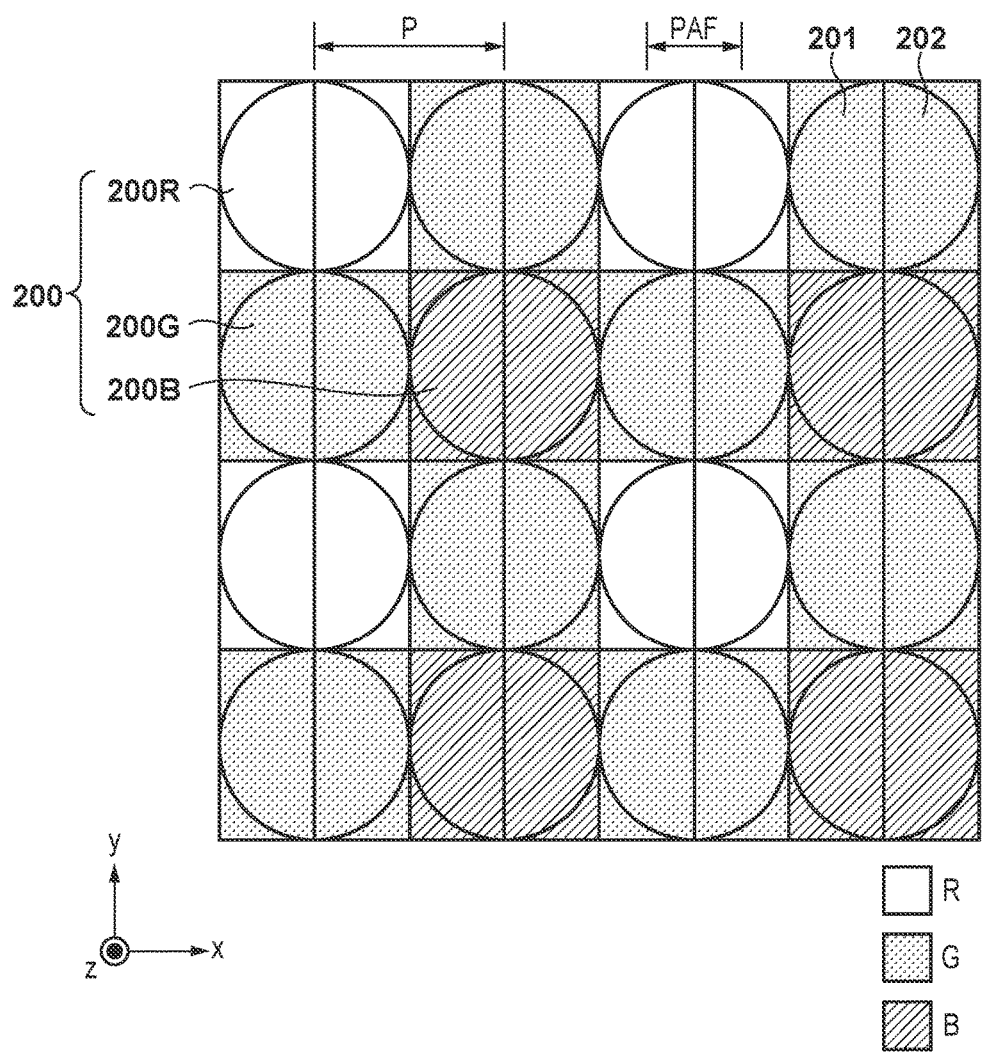
FIG. 2 is a diagram schematically showing an arrangement of imaging pixels and focus detection pixels in an image sensor 122 in FIG. 1.

FIG. 2 schematically shows 4 columns×4 rows of imaging pixels among the pixels arranged in rows and columns in the image sensor 122 according to this embodiment. In the image sensor 122 according to this embodiment, each photoelectric conversion area in an imaging pixel for obtaining a signal for one pixel of a captured image is divided into two in a row direction, and the output of each photoelectric conversion area can be acquired. Since the image data for imaging-plane phase-difference detection AF can be generated using the output of each photoelectric conversion area, individual photoelectric conversion areas can each be regarded as a focus detection pixel. Accordingly, it can also be said that FIG. 2 shows 8 columns×4 rows of focus detection pixels.

The image sensor 122 is provided with primary color Bayer array color filters with 2 rows×2 columns of imaging pixels as a repetition unit 200. The repetition unit 200 is constituted by two imaging pixels 200G each provided with a G (green) color filter, one imaging pixel 200R provided with an R (red) color filter, and one imaging pixel 200B provided with a B (blue) color filter. In this specification, the color of a provided color filter is mentioned as the color of an imaging pixel in some cases. Simply calling a pixel "a pixel" refers to an imaging pixel. For example, the pixels 200G are green pixels, the pixel 200R is a red pixel, and the pixel 200B is a blue pixel. As represented in an upper right pixel in FIG. 2, each imaging pixel has a photoelectric conversion unit that is equally divided vertically into two, and the left half and the right half of the photoelectric conversion unit can be used respectively as a first focus detection pixel 201 and a second focus detection pixel 202. When a pixel is used as an imaging pixel, a signal obtained by adding the signals obtained by the two photoelectric conversion units is used as an imaging signal.

By arranging a large number of the arrays of 4×4 imaging pixels (8×4 focus detection pixels) shown in FIG. 2 on an imaging plane of the image sensor 122, focus detection using the imaging-plane phase-difference detection method in which various positions of a screen are used as focus detection areas can be performed while acquiring a captured image. In this embodiment, it is assumed that the pitch (cycle) P of the imaging pixels is 4 μm both in the horizontal and vertical directions, and the number of pixels N is 5575 in the horizontal direction×3725 in the vertical direction=approximately 20.75 million pixels. Although the pitch P of the focus detection pixels in the vertical direction is the same as the imaging pixels, it is assumed that the pitch $P_{AF}$ in the horizontal direction is 2 μm, and accordingly, the number of focus detection pixels $N_{AF}$ is 11150 in the horizontal direction×3725 in the vertical direction=approximately 41.50 million pixels.

Figure 3A:
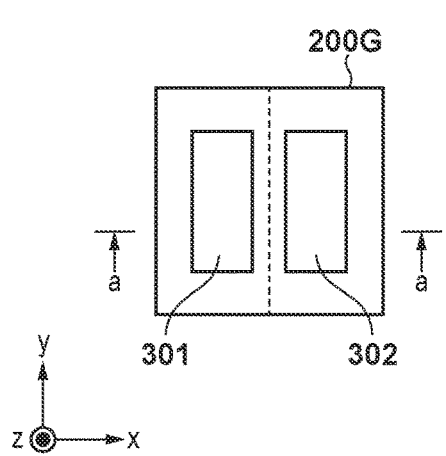
FIGS. 3A and 3B are a plan view and a cross-sectional view that schematically show a configuration of an imaging pixel shown in FIG. 2.
Figure 3B:
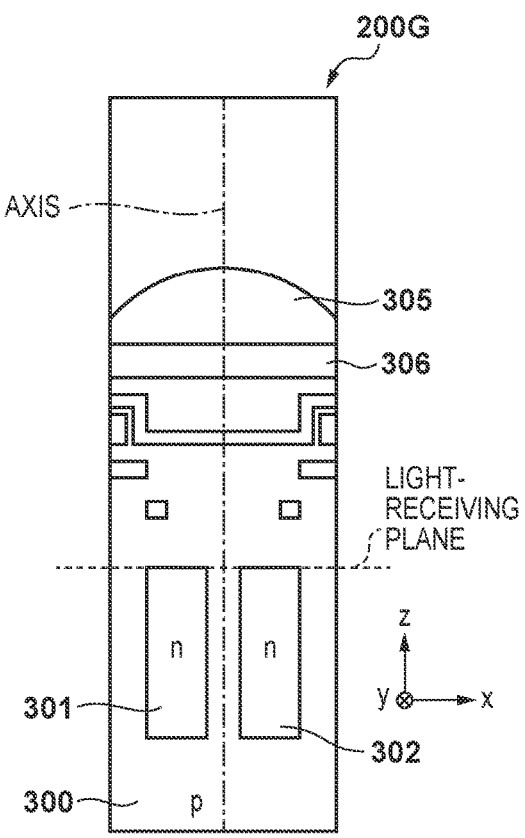

A plan view of one imaging pixel (here, 200G) shown in FIG. 2 as viewed from a light-receiving plane side (+z side) of the image sensor is shown in FIG. 3A, and a cross-sectional view thereof when viewing a cross-section taken along a line a-a of FIG. 3A from the −y side is shown in FIG. 3B.

As shown in FIGS. 3A and 3B, in the pixel 200G according to this embodiment, a microlens 305 for collecting incident light to the light-receiving side of each pixel is formed, and a photoelectric conversion unit 301 and a photoelectric conversion unit 302 are formed as a result of a photoelectric conversion unit being divided into $N_H$ (two) in the x direction and into $N_V$ (one) in the y direction. The photoelectric conversion portions 301 and 302 respectively correspond to the first focus detection pixel 201 and the second focus detection pixel 202.

The photoelectric conversion portions 301 and 302 may each be formed as a pin structure photodiode having an intrinsic layer between a p-type layer and an n-type layer, or a pn junction photodiode while omitting an intrinsic layer as necessary.

In each pixel, a color filter 306 is formed between the microlens 305 and the photoelectric conversion portions 301 and 302. The spectral transmittance of the color filter may be different between the first focus detection pixel 201 and the second focus detection pixel 202, or the color filter may be omitted, as necessary.

The light incident on the pixel 200G shown in FIGS. 3A and 3B is collected by the microlens 305 and divided by the color filter 306, and is thereafter received by the photoelectric conversion unit 301 and the photoelectric conversion unit 302.

In the photoelectric conversion units 301 and 302, an electron and a hole are generated in pair in accordance with the quantity of received light and separated from each other by a depletion layer, and thereafter, negatively charged electrons are accumulated in the n-type layer, and holes are discharged to the outside of the image sensor 122 through a p-type layer 300 connected to a constant voltage source (not shown).

The electrons accumulated in the n-type layer in the photoelectric conversion units 301 and 302 are transferred to an electrostatic capacitance portion (Floating Diffusion: FD) via a transfer gate, and are converted into a voltage signal.

Figure 4:
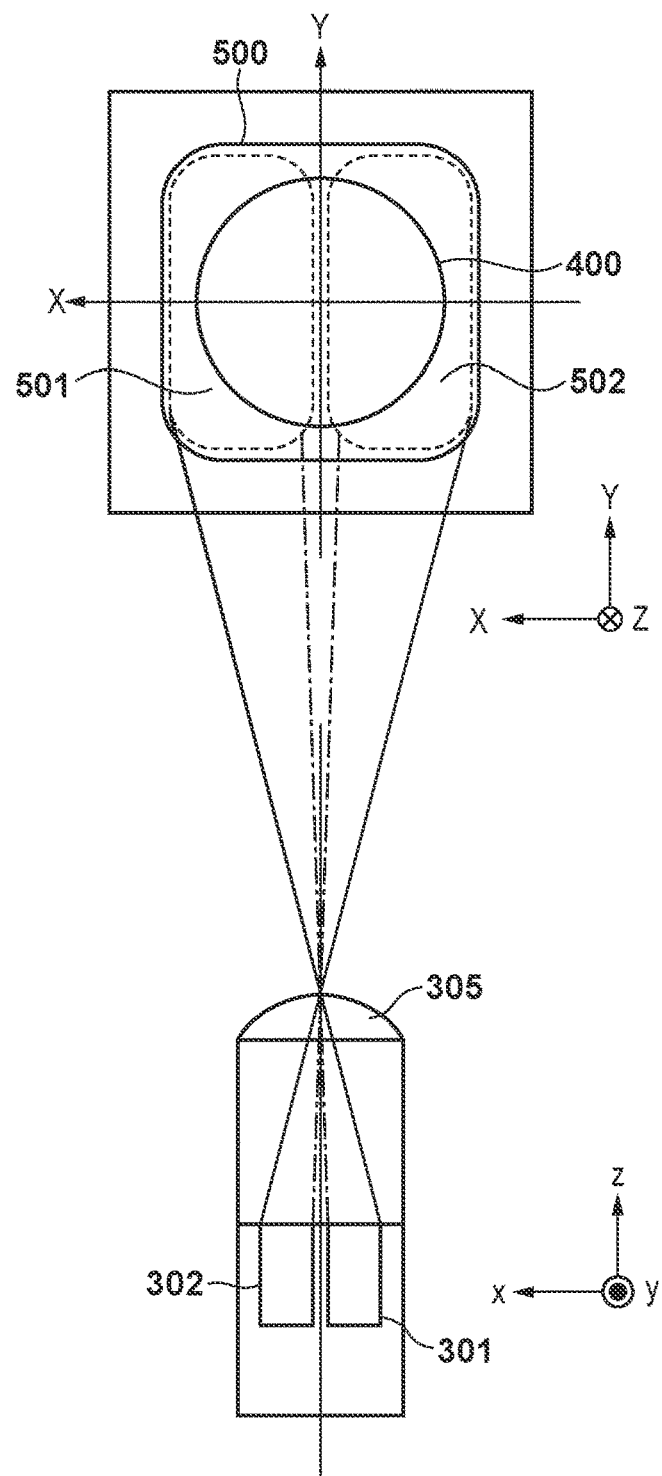
FIG. 4 is a schematic illustrative diagram showing a correspondence relationship between a pixel structure shown in FIGS. 3A and 3B and pupil division.

FIG. 4 shows a schematic illustrative diagram showing a correspondence relationship between the pixel structure shown in FIGS. 3A and 3B and pupil division according to this embodiment. In FIG. 4, the x axis and the y axis of the cross-sectional view are inverted with respect to FIGS. 3A and 3B in order to associate these axes with the coordinate axes of the exit pupil plane.

In FIG. 4, a first partial pupil area 501 of the first focus detection pixel 201 roughly conjugates with the light-receiving plane of the photoelectric conversion unit 301 whose center of gravity is decentered in the −x direction, due to the microlens 305, and represents a pupil area in which light can be received in the first focus detection pixel 201. In the first partial pupil area 501 of the first focus detection pixel 201, the center of gravity is decentered to the +x side on the pupil plane.

In FIG. 4, a second partial pupil area 502 of the second focus detection pixel 202 roughly conjugates with the light-receiving plane of the photoelectric conversion unit 302 whose center of gravity is decentered in the +x direction, due to the microlens 305, and represents a pupil area in which light can be received in the second focus detection pixel 202. In the second partial pupil area 502 of the second focus detection pixel 202, the center of gravity is decentered to the −x side on the pupil plane.

Furthermore, in FIG. 4, a pupil area 500 is a pupil area in which light can be received by the entire pixel 200G, the area being a combination of the photoelectric conversion unit 301 and the photoelectric conversion unit 302 (the first focus detection pixel 201 and the second focus detection pixel 202).

Figure 5A:
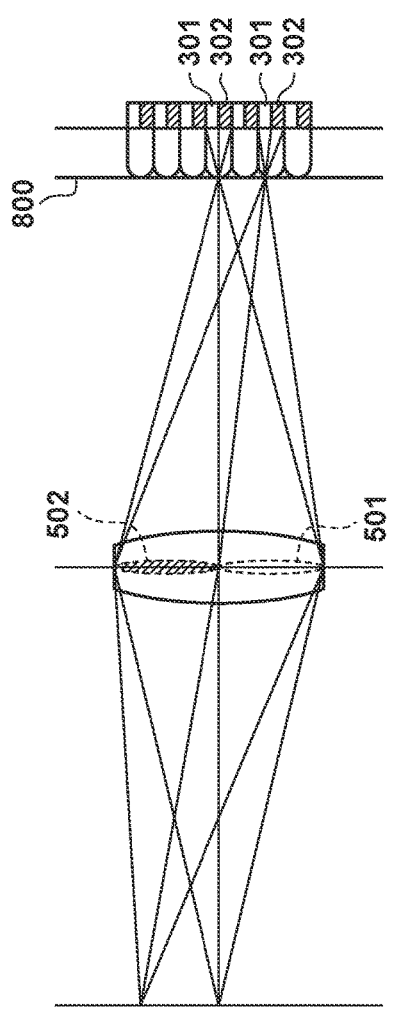
FIG. 5A is a diagram showing a correspondence relationship between the image sensor and pupil division in an embodiment.

FIG. 5A shows a schematic diagram showing a correspondence relationship between the image sensor according to this embodiment and the pupil division. Light beams that have passed through different partial pupil areas, namely the first partial pupil area 501 and the second partial pupil area 502 are incident on respective (imaging) pixels of the image sensor from an imaging plane 800 at different angles, and are received by the photoelectric conversion units 301 and 302 that are obtained by dividing one photoelectric conversion unit into two. Note that although the pupil area is subjected to horizontal pupil division into two in this embodiment, vertical pupil division may be performed as necessary.

In the image sensor 122, imaging pixels each having the first focus detection pixel 201 for receiving the light beam that has passed through the first partial pupil area 501 in the image forming optical system and the second focus detection pixel 202 for receiving the light beam that has passed through the second partial pupil area 502, which is different from the first partial pupil area, in the image forming optical system, are arranged. Accordingly, each imaging pixel receives light beams that have passed through the pupil area 500 that is a combination of the first partial pupil area 501 and the second partial pupil area 502 in the image forming optical system.

Note that the imaging pixel, the first focus detection pixel, and the second focus detection pixel may be configured to be separate pixels, rather than a configuration in which all pixels provided in the image sensor 122 each have a plurality of photoelectric conversion units. Alternatively, imaging pixels each having one photoelectric conversion unit and focus detection pixels (that can also be used as imaging pixels) each having two photoelectric conversion units may be arranged.

In this embodiment, the image processing circuit 124 combines a plurality of signals obtained by adding the output of four first focus detection pixels 201 in each repetition unit of the color filters shown in FIG. 2 to generate one image signal for phase-difference AF (hereinafter referred to as an image A). The image processing circuit 124 also combines a plurality of signals obtained by adding the output of four second focus detection pixels 202 in each repetition unit of the color filters to generate another one image signal for phase-difference AF (hereinafter referred to as an image B). A pair of images A and B forms the image data for phase-difference AF. A signal in which respective color components of R, G, and B are reflected can be obtained by adding the output of the same type of focus detection pixels existing within a repetition unit of the color filters, and therefore, this signal can be treated as a brightness signal in which the spectral sensitivity has low deviation. Note that when obtaining a captured image, a signal obtained by adding the output of the first focus detection pixel 201 and the output of the second focus detection pixel 202 is acquired for each pixel unit.

Relationship Between a Defocus Amount and a Phase Difference Between Images

Figure 5B:
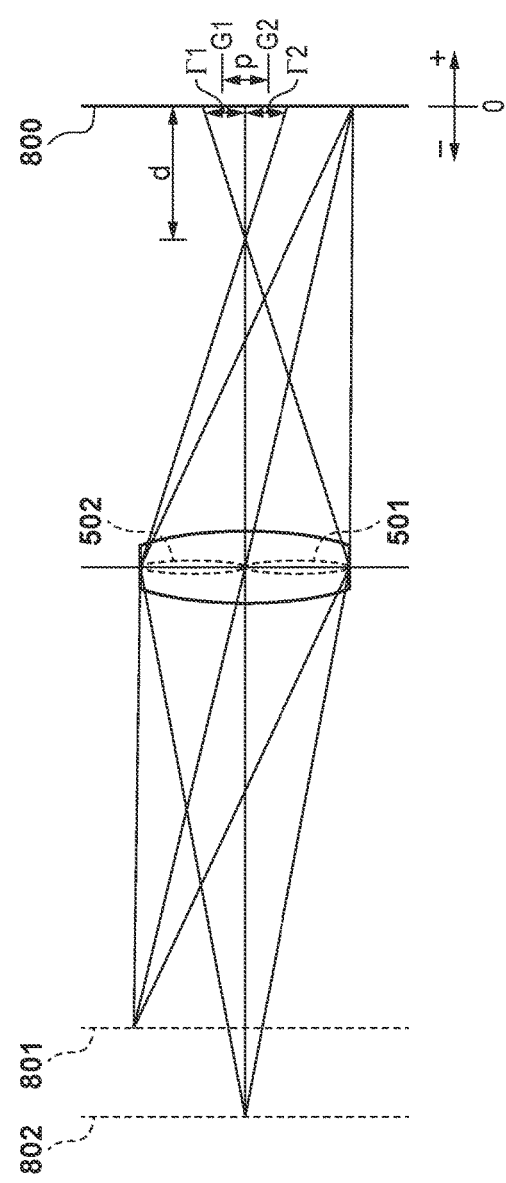
FIG. 5B is a diagram showing a relationship between a defocus amount and a phase difference between a first focus detection signal and a second focus detection signal according to the embodiment.

A description will be given below of a relationship between a defocus amount of the optical system and a phase difference between a pair of images A and B that constitutes image data for phase-difference AF and is generated by the image processing circuit 124 according to this embodiment. FIG. 5B is a schematic diagram showing a relationship between a defocus amount and a phase difference between the first focus detection signal (image A) and the second focus detection signal (image B). The image sensor 122 is arranged on the imaging plane 800, and the exit pupil of the imaging optical system is divided into two, namely into the first partial pupil area 501 and the second partial pupil area 502, as described with reference to FIGS. 4 and 5A.

The magnitude |d| of a defocus amount d is the distance from the image forming position of a subject to the imaging plane 800. A negative defocus amount d (d<0) means a front-focus state in which the image forming position of the subject is located on the subject side relative to the imaging plane 800, and a positive defocus amount d (d>0) means a rear-focus state in which the image forming position of the subject is located on the side opposite to the subject relative to the imaging plane 800. The defocus amount d is 0 when in an in-focus state in which the image forming position of the subject is located on the imaging plane 800. FIG. 5A shows an example in which a subject 801 is in an in-focus state (d=0), and a subject 802 is in the front-focus state (d<0). The front-focus state (d<0) and the rear-focus state (d>0) will be collectively referred to as a defocused state (|d|>0).

When in the front-focus state (d<0), among light beams from the subject 802, a light beam that has passed through the first partial pupil area 501 (second partial pupil area 502) is first collected at a position on the subject side relative to the imaging plane 800. Thereafter, this light beam expands to a width Γ1 (Γ2) with a center of gravity position G1 (G2) of the light beam as the center, and becomes a blurred image on the imaging plane 800. The blurred image is converted into an electric signal at each of a plurality of pixels that receives this blurred image, by the first focus detection pixel 201 (second focus detection pixel 202). Then, as mentioned above, the phase-difference AF unit generates the first focus detection signal (image A) from the signal from the first focus detection pixel 201, and the second focus detection signal (image B) from the signal from the second focus detection pixel 202. Accordingly, the image A (image B) is recorded as a subject image in which the subject 802 is blurred having the width Γ1 (Γ2), in the center of gravity position G1 (G2) on the imaging plane 800.

The blur width Γ1 (Γ2) of the subject image increases roughly in proportion to an increase in a magnitude |d| of the defocus amount d. Similarly, a magnitude |p| of the phase difference p (=a difference G1-G2 between the center of gravity positions of light beams) of the subject images between the first focus detection signal and the second focus detection signal also increases roughly in proportion to an increase in the magnitude |d| of the defocus amount d. When in the rear-focus state (d>0), the relationship between the magnitude |d| of the defocus amount, the blur width of the subject image, and the phase difference p is similar except that the direction of an image shift between the image A and the image B is opposite to that when in the front-focus state.

Accordingly, the magnitude of the phase difference between the image A and the image B increases with an increase in the amount of the defocus amount.

Focus Detection

[Focus Detection Area]

Figure 6:
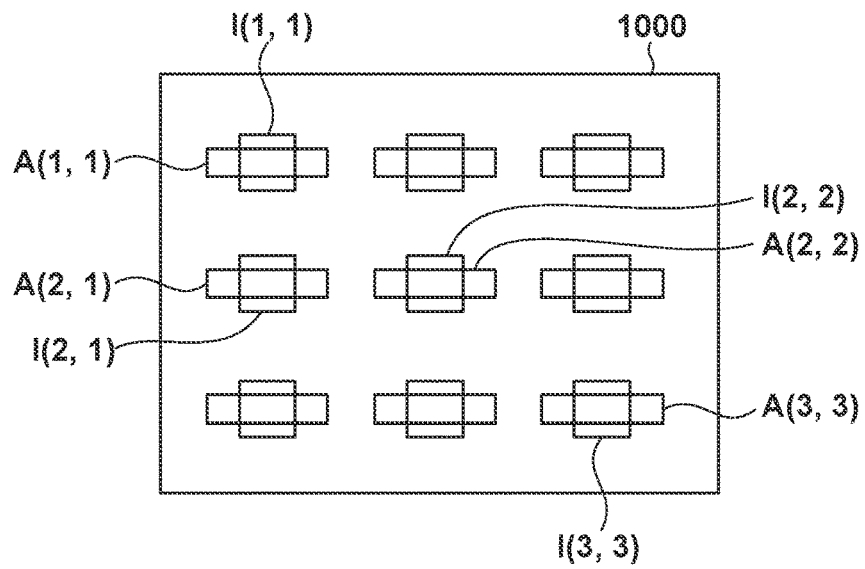
FIG. 6 is a diagram schematically showing an arrangement of a focus detection area according to the embodiment.

First, a description will be given of a focus detection area, which is a pixel area of the image sensor 122 that is used for generating the first focus detection signal and the second focus detection signal. In FIG. 6, focus detection areas that are set in an effective pixel area 1000 of the image sensor 122 are laid over indicators of the focus detection areas that are displayed on the display 126 at the time of focus detection. Although there are three focus detection areas in the row direction and three focus detection areas in the column direction, i.e., a total of nine focus detection areas are set in this embodiment, this is merely an example, and a larger or a smaller number of focus detection areas may be set. Also, the focus detection areas may not be set at equal intervals. Furthermore, in the case where every pixel in the effective pixel area 1000 has the first focus detection pixel and the second focus detection pixel as in the image sensor 122, the position and the size of the focus detection areas may be dynamically set. For example, a given area may be set as a focus detection area with a position designated by a user as the center.

In FIG. 6, a focus detection area that is $n^{th}$ in the row direction and $m^{th}$ in the column direction is denoted as A (n, m), and an indicator having a rectangular frame shape and indicating the focus detection area A (n, m) is denoted as I (n, m). The image A and the image B that are used for detecting the defocus amount in a focus detection area are generated based on the signals obtained from the first focus detection pixel 201 and the second focus detection pixel 202 within this focus detection area. The indicator I (n, m) is usually displayed while being superimposed on a live view image.

[Focus Detection]

Figure 7:
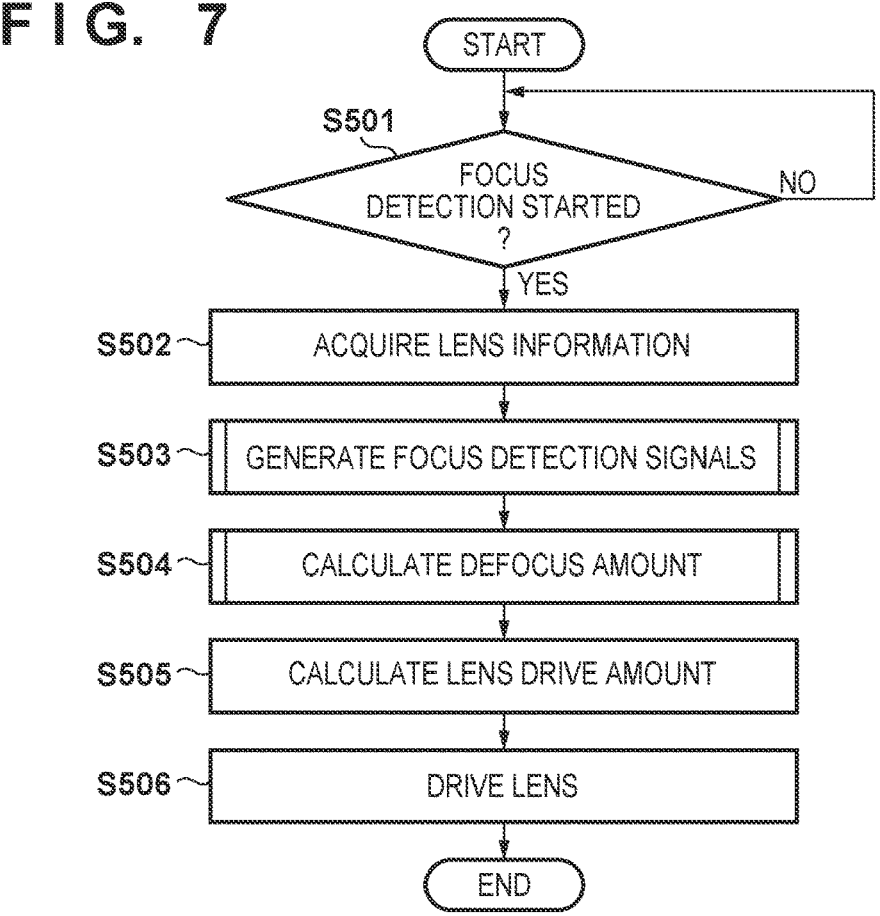
FIG. 7 is a flowchart for illustrating an entire focus adjustment operation according to the embodiment.

Next, a focus detection operation of the digital camera 100, which is achieved mainly by the camera MPU 125, will be described using a flowchart shown in FIG. 7. Note that this processing is performed at live-view display (when shooting a moving image to be displayed), such as that at standby for shooting, and when recording a moving image (when shooting a moving image to be recorded).

In step S501, the camera MPU 125 checks whether or not an instruction to start the focus detection operation has been input through the operation switch group 127, and the camera MPU 125 advances the processing to step S502 if an instruction has been input, or waits if an instruction has not been input. Note that a trigger for the camera MPU 125 advancing the processing to step S502 is not limited to the input of the instruction to start focus detection, and may also be starting of live-view display or moving image recording.

In step S502, the camera MPU 125 acquires various kinds of lens information such as the F-number of the lens unit 110, lens frame information, the focusing lens position, the focusing correction amount, and the maximum defocus amount, from the lens MPU 117 via the mount M.

In step S503, the camera MPU 125 instructs the image processing circuit 124 to generate the first focus detection signal (image A) and the second focus detection signal (image B) from the pixel data within the focus detection area in frame image data that is sequentially read out. The image processing circuit 124 generates the image A and the image B in accordance with the instruction, and outputs these images to the camera MPU 125. As described later, in this embodiment, the image processing circuit 124 generates multiple pairs of the image A and the image B.

In step S504, the camera MPU 125 supplies the multiple pairs of the image A and the image B generated by the image processing circuit 124 to the phase-difference AF unit 129. The phase-difference AF unit 129 applies known correlation computation to each pair of the image A and the image B to calculate the phase difference. The phase-difference AF unit 129 also determines the reliability of the detected phase differences, and converts one of a plurality of obtained phase differences into a defocus amount. The details of this process will be described later. The phase-difference AF unit 129 outputs the obtained defocus amount to the camera MPU 125.

In step S505, the camera MPU 125 calculates a driving direction and the amount of driving of the focusing lens 104 of the lens unit 110 based on the defocus amount obtained from the phase-difference AF unit 129 in step S504. Note that if the phase-difference AF unit 129 determines that focus detection is impossible, the camera MPU 125 stops the focusing lens 104. Alternatively, the camera MPU 125 causes the drive mode of the focusing lens 104 to transition to a search drive mode, and calculates the lens drive amount for driving the lens by a given amount. For example, the camera MPU 125 determines to drive the focusing lens 104 by a given amount in a direction in which the subject is likely to exist, e.g., to the close side, which is determined in advance.

In step S506, the camera MPU 125 transmits the information regarding the driving direction and the amount of driving of the focusing lens 104 to the focus drive circuit 116 via the mount M and the lens MPU 117. The focus drive circuit 116 drives the focusing lens 104 based on the received information regarding the received driving direction and amount of driving. Thus, focus adjustment of the lens unit 110 is performed. Note that the operation in FIG. 7 may also be similarly performed for the next and subsequent frames of moving image data.

Figure 8:
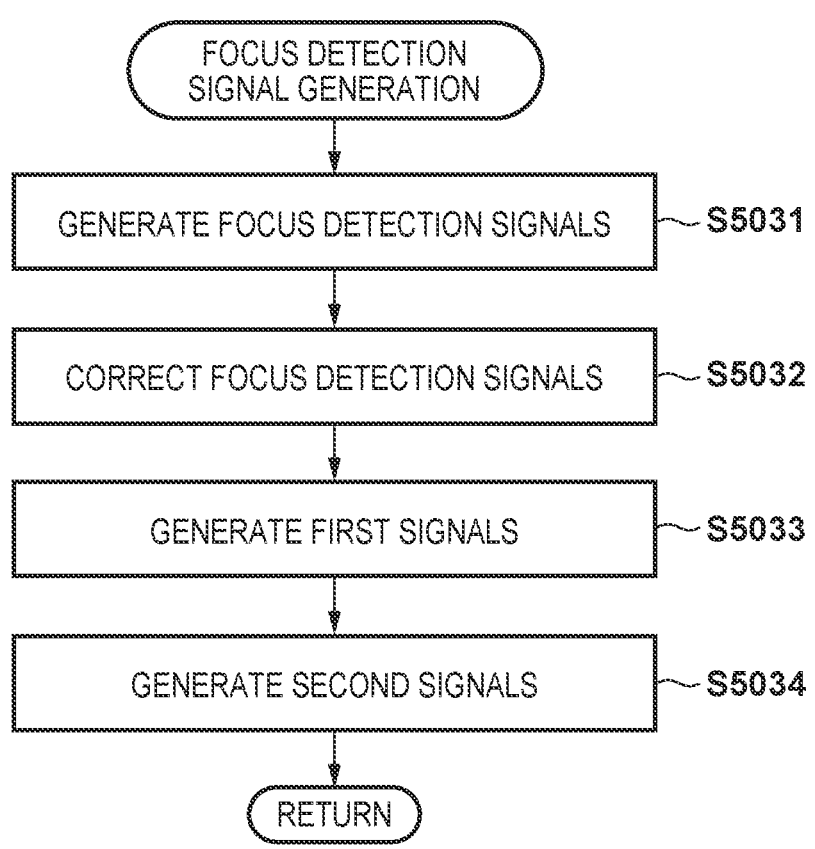
FIG. 8 is a flowchart for illustrating focus detection signal generation processing according to a first embodiment.

Next, signal generation processing performed by the image processing circuit 124 in step S503 in FIG. 7 will be described using the flowchart shown in FIG. 8.

First, in step S5031, the image processing circuit 124 generates a pair of focus detection signals using the output of the first focus detection pixel 201 and the second focus detection pixel 202 that each pixel in the focus detection area has. As mentioned above, the image processing circuit 124 first adds the output of the first focus detection pixel 201 (second focus detection pixel 202) in each repetition unit of the color filters, and thereafter combines the output in the focus detection direction and generates the image A (image B), which is an image signal for focus detection.

Next, in step S5032, the image processing circuit 124 corrects the pair of image signals generated in step S5031. For example, this correction includes correction of a level difference between the image signals caused by a decrease in the peripheral light quantity (vignetting) in the optical system, and correction of fixed pattern noise caused by variation in pixel sensitivity. The image processing circuit 124 temporarily saves the post-correction image signals in the RAM 125b of the camera MPU 125, for example.

In step S5033, the image processing circuit 124 reads out the post-correction image signals from the RAM 125b, and generates first signals. The first signals are a pair of image signals obtained by reducing data volume of the post-correction image A and image B, and the image processing circuit 124 generates the first signals by thinning out the data, or replacing a plurality of sets of adjacent data with a representative value, for example.

It is assumed, for example, that the first signals having a data volume that has been compressed to ⅓ are generated by replacing three successive sets of data with a representative value (here, an average value). In this case, assuming that the post-correction image A and image B are expressed respectively as A(k) and B(k), k being an integer that satisfies $1 \leq k \leq p$, the first signals A2(m) and B2(m), m being an integer that satisfy $1 \leq m \leq Q$, are expressed by Formulas (1) and (2) below.

$$A2(m)=(A(m)+A(m+1)+A(m+2))/3 \quad (1)$$

$$B2(m)=(B(m)+B(m+1)+B(m+2))/3 \quad (2)$$

With these formulas, the number of sets of data that form the first signals A2(m) and B2(m) is compressed (reduced) to approximately P/3. The image processing circuit 124 saves the first signals in the RAM 125b of the camera MPU 125, for example.

In step S5034, the image processing circuit 124 again reads out the post-correction image signals from the RAM 125b, and generates second signals. The second signals are a pair of image signals obtained by reducing the data volume of the post-correction images A and B, the amount of which the data volume was reduced being smaller than in the case of the first signals. For example, in the case of not reducing the data volume, the image processing circuit 124 can use the read post-correction image A and image B as-is as the second signals. Assuming that the post-correction image A and image B are expressed respectively as A(k) and B(k), in which k is an integer that satisfies $1 \leq k \leq P$, the second signals A3(n) and B3(n), in which n is an integer that satisfies $1 \leq n \leq P$, are expressed by Formulas (3) and (4) below.

$$A3(n)=A(n) \quad (3)$$

$$B3(n)=B(n) \quad (4)$$

The image processing circuit 124 saves the second signals in the RAM 125b of the camera MPU 125, for example.

The data compression rate (the post-compression data volume/pre-compression data volume (%)) of the first signals and the second signals generated in steps S5033 and S5034 are not limited to the above examples. For example, a configuration may be employed in which, if the data compression rate of a recording image is high, the data volume of the first signals is compressed to ⅙, and the data volume of the second signals is compressed to ½.

After ending generation of the second signals in step S5034, the image processing circuit 124 ends the focus detection signal generation processing.

Figure 9:
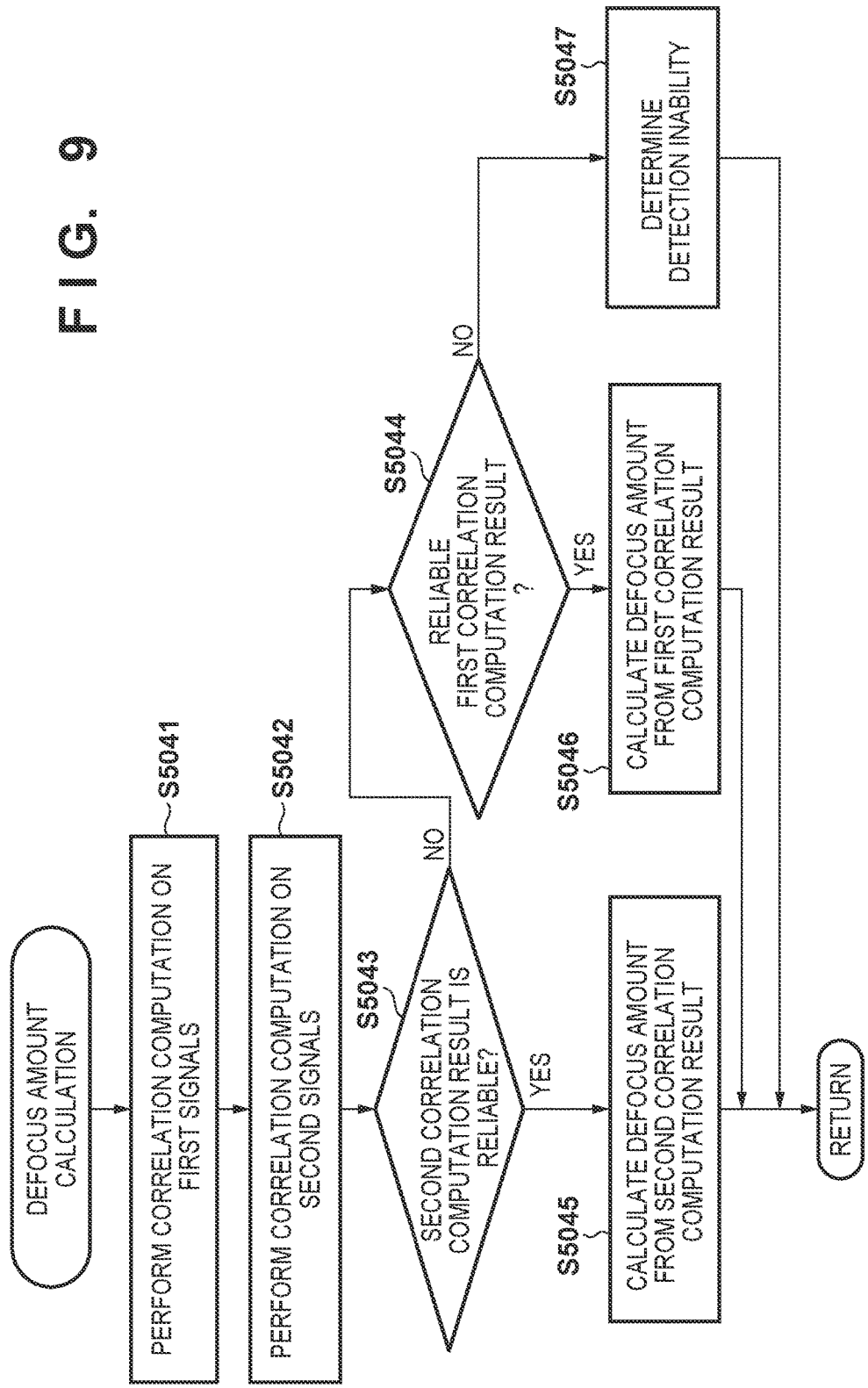
FIG. 9 is a flowchart for illustrating defocus amount calculation processing according to the first embodiment.

Next, a further description will be given of defocus amount detection processing performed by the phase-difference AF unit 129 in step S504 in FIG. 7, using a flowchart in FIG. 9.

In step S5041, the phase-difference AF unit 129 performs correlation computation (first correlation computation) on the image A and the image B of the first signals, of the first signals and the second signals that are supplied from the camera MPU 125. When performing the correlation computation, the phase-difference AF unit 129 sets the number of sets of data within a field of view and the number of sets of shift data. The data within the field of view corresponds to a window when performing the correlation computation, and determines the extent of the area for which focus detection is to be performed. If the number of sets of data within the field of view is increased, the reliability of a correlation computation result can be improved, whereas a shifting of focus between far and close subjects is likely to occur when subjects at different distances exist within the focus detection area. A "shifting of focus between far and close subjects" refers to a phenomenon in which the defocus amount cannot be detected or the defocus amount of an incorrect subject is detected when the correlation computation is performed on image signals associated with subjects at different distances.

To detect an accurate defocus amount while suppressing the occurrence of a shift of focus between far and close subjects, an appropriate area (section) to be used in the correlation computation needs to be set for the image A and the image B based on information such as subject size and a focal length (angle of view) of the optical system. The size of this area is determined by the number of sets of data within the field of view, and for example, the phase-difference AF unit 129 can set the number of sets of data within the field of view by referencing a table in which the number of sets of data within the field of view is registered for each combination of types and values of predetermined parameters. The number of sets of shift data corresponds to a maximum shift amount when calculating the correlation amount while changing a relative position between the image A and the image B. If the maximum shift amount of the image A and the image B when calculating the correlation amount is increased, the defocus amount can be detected for a significantly blurred subject, but on the other hand, the amount of computation required for calculating the correlation amount increases, and the time required for focus detection increases.

In this embodiment, since the compression rate of the first signals is higher than that of the second signals, the number of sets of shift data that corresponds to the same shift amount of the post-compression image A and image B is smaller than that of the second signals. For this reason, the correlation computation is performed while setting the number of sets of shift data that corresponds to a larger shift amount than that in the correlation computation for the second signals, and focus detection is performed in a wider defocus area.

A correlation amount COR1(h) to be used in the first correlation computation can be calculated with Formula (5) below, for example.

$$COR1(h) = \sum_{j=1}^{W1} |A2(j + h\max - h) - B2(j + h\max + h)| \quad (-h\max \leq h \leq h\max) \tag{5}$$

In Formula (5), W1 corresponds to the number of sets of data within the field of view, and hmax corresponds to the number of sets of shift data. The phase-difference AF unit 129 obtains a correlation amount COR1(h) for each shift amount h, and thereafter obtains the value of a shift amount h with which the correlation between the image A and the image B is highest, i.e., a shift amount h with which the correlation amount COR1(h) is smallest (i.e., a shift amount corresponding to the phase difference between the image A and the image B). Note that although the shift amount h when calculating the correlation amount COR1(h) is an integer, in the case of obtaining the shift amount h with which the correlation amount COR1(h) is smallest, interpolation processing is performed and a value (real value) in a sub-pixel unit is obtained in order to improve the accuracy of the defocus amount.

Note that in this embodiment, the shift amount by which the sign of a difference value of the correlation amount COR1 changes is calculated as the shift amount h (sub-pixel unit) with which the correlation amount COR1(h) is smallest.

First, the phase-difference AF unit 129 calculates a difference value DCOR1 of the correlation amount in accordance with Formula (6) below.

$$DCOR1(h) = COR1(h) - COR1(h-1) \tag{6}$$

Then, the phase-difference AF unit 129 obtains a shift amount dh1 by which the sign of the difference amount changes, using the difference value DCOR1 of the correlation amount. Assuming that the value of h immediately before the sign of the difference amount changes is h1, and the value of h with which the sign changes is h2 (h2=h1+1), the phase-difference AF unit 129 calculates the shift amount dh1 in accordance with Formula (7) below.

$$dh1 = h1 + |DCOR1(h1)|/|DCOR1(h1) - DCOR1(h2)| \tag{7}$$

As above, the phase-difference AF unit 129 calculates, in the sub-pixel unit, the shift amount dh1 with which the correlation between the image A and the image B of the first signals is largest, and ends the processing in step S5041. Note that the method for calculating a phase difference between two one-dimensional image signals is not limited to the above-described one, and may be any known method.

Next, in step S5042, the phase-difference AF unit 129 performs correlation computation (second correlation computation) on the image A (A3) and the image B (B3) of the second signals. Here as well, the phase-difference AF unit 129 sets the number of sets of data within the field of view and the number of sets of shift data. The number of sets of data within the field of view is set giving consideration to a shift of focus between far and close subjects, and the defocus detection accuracy, as mentioned above. In this embodiment, the phase-difference AF unit 129 sets the number of sets of data within the field of view that corresponds to roughly the same area as the area corresponding to the number of sets of data within the field of view which is set at the time of first correlation computation, for the pre-compression image A and image B. In the case where the starting point of the signals to be used in the correlation computation is common to the first signal and the second signal, this can be achieved by setting the number of sets of data within the field of view obtained while considering a difference in the compression rate. In this embodiment, since the first signals have been compressed to ⅓ of the second signals, the number of sets of data within the field of view in the second correlation computation need only be three times the number of sets of data within the field of view in the first correlation computation.

Thus, in the correlation computation for the first signals and the correlation computation for the second signals, the number of sets of data within the field of view is set so as to target roughly the same area in the pre-compression image signals, and it is thereby possible to switch and use two correlation computation results. If the two correlation computations target different areas in the pre-compression image signals, there is a possibility that the respective correlation computation results target different subjects, and in the case of driving the focusing lens while switching the two correlation computation results, the subject that the focusing lens focuses on changes in some cases. In this embodiment, the first correlation computation and the second correlation computation are performed based on the same area of the image signals although the range of the detectable defocus amount is different, and therefore, these correlation computations can be switched and used in accordance with the degree of focusing.

In this embodiment, since the compression rate of the second signals is lower than that of the first signals, the second signals have more high-frequency components than those of the first signals. Therefore, a relatively large phase difference per unit defocus amount can be secured regardless of the influence of an aberration of the optical system and the F-number, and a more accurate defocus amount can be detected than in the case of using the first signals. On the other hand, since the data volume of the second signals is larger than that of the first signals, the amount of computation for obtaining the correlation amount for each shift amount of the second signals is larger than that of the first signals. Furthermore, since the number of times of shifting of the second signals for obtaining the correlation amount corresponding to an area of the same defocus amount is larger than that of the first signals, if the same number of sets of shift data as that in the first correlation computation is set in the second correlation computation, the amount of computation further increases. Accordingly, in the second correlation computation, the number of sets of shift data is set smaller than in the first correlation computation, and the defocus amount is detected in a narrower area.

The phase-difference AF unit 129 calculates a correlation amount COR2(g) and a difference value DCOR2(g) of the correlation amount that are used in the second correlation computation, similarly to the correlation amount COR1(h) and the difference value of the correlation amount DCOR1(h), except that the values of the number of sets of data within the field of view W and the number of sets of shift data hmax are different. The phase-difference AF unit 129 also calculates, in the sub-pixel unit, a shift amount dh2 with which the correlation between the image A and the image B of the second signals is largest, similarly to dh1.

Next, in step S5043, the phase-difference AF unit 129 evaluates the reliability of the second correlation computation result. The reliability evaluation can be performed based on the magnitude of the minimal value of COR2(g) and the magnitude of DCOR2(g) near the shift amount dh2, for example. Since a smaller minimal value of COR2(g) indicates a higher degree of coincidence between the image A signal and the image B signal, the reliability of the correlation computation result can be evaluated to be higher as the minimal value of COR2(g) is smaller. Also, a larger magnitude of DCOR2(g) indicates a larger change in the correlation amount with respect to the shift amount, and therefore, the accuracy of the shift amount dh2 in the sub-pixel unit is high, and the reliability of the correlation computation result can be similarly evaluated to be high. The phase-difference AF unit 129 evaluates the reliability of the correlation computation result using one or more of these values. Note that in the case of using a plurality of values in the evaluation, the correlation computation result can be evaluated to be reliable (i.e., the reliability is high) if individual values are reliable to a certain extent and at least one of the values corresponds to high reliability, for example. Note that these evaluation criteria are merely an example, and other evaluation criteria may also be employed.

If it is determined in step S5043 that the second correlation computation result is reliable, the phase-difference AF unit 129 advances the processing to step S5045, and applies a predetermined sensitivity to the shift amount (i.e., the phase difference) obtained by the second correlation computation to calculate the defocus amount. The phase-difference AF unit 129 then outputs the calculated defocus amount to the camera MPU 125 and ends the processing. As mentioned above, in the second correlation computation using the second signals, the detectable defocus range is narrower than in the first correlation computation that uses the first signals, but the detection accuracy is higher. Accordingly, if the second correlation computation result is reliable, the defocus amount is detected preferentially using the second correlation computation result rather than the first correlation computation result.

On the other hand, if it is determined in step S5043 that the second correlation computation result is not reliable (i.e., the reliability is low), the phase-difference AF unit 129 advances the processing to step S5044 and evaluates the reliability of the first correlation computation result. Although the reliability evaluation can be performed similarly to the second correlation computation result, the evaluation criteria may be looser than those used for the second correlation computation result. If it is determined that the first correlation computation result is reliable (i.e., the reliability is high), the phase-difference AF unit 129 advances the processing to step S5046, and applies a predetermined sensitivity to the shift amount (i.e., the phase difference) obtained in the first correlation computation to calculate the defocus amount. The phase-difference AF unit 129 then outputs the calculated defocus amount to the camera MPU 125 and ends the processing. Since it has been determined that the second correlation computation result is not reliable, it is inferred that the defocused state does not indicate focusing on a close subject (i.e., the defocus amount is large). Accordingly, the defocus amount is detected using the result of the first correlation computation in which the detectable defocus range is wider than in the second correlation computation.

If it is determined in step S5044 that the first correlation computation result is not reliable either (i.e., the reliability is low), the phase-difference AF unit 129 advances the processing to step S5047, determines that focus detection is impossible, notifies the camera MPU 125 of this determination, and ends the processing.

Thus, in this embodiment, multiple pairs of signals with different compression rates are generated from the first focus detection signal and the second focus detection signal, and a phase difference of each signal pair is detected. Then, the defocus amount is calculated based on the phase difference of the signal pair whose compression rate is lower (or lowest) among the phase differences that are determined as being highly reliable. Advantages of this configuration will now be described.

FIG. 10 is a diagram showing combinations of the number of sets of data within the field of view W and the number of sets of shift data hmax used in the first correlation computation and the second correlation computation according to this embodiment. Since the first signals, for which the first correlation computation is performed, are signals obtained by compressing the focus detection signals (image A and image B) to ⅓ in the phase-difference detection direction, the number of sets of data within a field of view W1 is ⅓ of the number of sets of data within a field of view W2 in the second correlation computation. However, the sizes of the sections of focus detection signals to which the numbers of sets of data within the field of view W1 and W2 correspond are configured to be roughly the same. In addition, in the first correlation computation, a shift data amount S1 is set so as to enable the detection of a larger defocus amount (or a larger phase difference) than in the second correlation computation. For this reason, the ratio S1/W1 of the number of sets of shift data S1 to the number of sets of data within the field of view W1 is set to be larger than the ratio S2/W2 of the number of sets of shift data S2 to the number of sets of data within the field of view W2 in the second correlation computation.

In the case of the compression rate shown in FIG. 10, to enable a defocus amount in an area similar to that in the first correlation computation to be detected in the second correlation computation, the number of sets of shift data needs to be set three times as large as S1. Both a wide defocus detection area and accurate focus detection can thereby be performed, but the number of times of shift computation will be as large as ±3×S1. In this embodiment, both a reduction in the amount of computation and the ensuring of the computation accuracy are achieved with a smaller number of times of shifting (S1+S2) by ensuring the defocus area to be detected and the detection accuracy by means of multiple correlation computations.

Furthermore, since the first signals and the second signals used respectively in the first correlation computation and the second correlation computation are generated from image signals that are generated at the same time, two correlation computation results can be switched and used without being affected by a change of a subject over time. For example, in the above case, the second correlation computation, which is highly accurate, is configured to be used in a defocus area indicating focusing on a close subject. However, in an environment where the S/N ratio is not good, as in a low illuminance environment, there are cases where accurate detection can be achieved with the result of the first correlation computation, in which the compression rate is high. Accordingly, if predetermined conditions are satisfied, and it is determined that the first correlation computation result is reliable, a configuration may be employed in which the first correlation computation result is preferentially used to calculate the defocus amount.

Furthermore, although, in this embodiment, one of the two types of correlation computation result is selected and used, three of more types of correlation computation result may be calculated. It is thereby possible to obtain correlation computation results that correspond to more specific combinations of the defocus area to be detected and the detection accuracy, and a further reduction in the amount of computation can also be achieved. Furthermore, although the defocus amount is calculated after selecting one of phase differences, a configuration in which defocus amounts are calculated from individual phase differences respectively and one of these defocus amounts is selected may also be employed. If three or more correlation computation results (or phase differences) are calculated, for example, the reliability is evaluated in descending order of defocus amount detection accuracy, and the defocus amount may be calculated based on the phase difference that is first determined as being reliable (i.e., the reliability is high).

As described above, according to this embodiment, in the focus detection using the phase-difference detection method using output signals of the focus detection pixels, the defocus amount is detected based on one of the results of multiple correlation computations in which the detectable defocus range and the focus detection accuracy are different. For example, the defocus amount is detected using one of the results of correlation computation regarding multiple pairs of signals with different data volumes with which the wider the detectable defocus range is, the lower the focus detection accuracy is. It is thereby possible to achieve the accuracy appropriate for the defocus amount with a smaller amount of computation compared with the case of obtaining accurate detection accuracy over a wide defocus detection area using one correlation computation.

Second Embodiment

A second embodiment of the present invention will be described using FIG. 11. The first embodiment employs a configuration in which individual correlation computation results are obtained, and thereafter one correlation computation result (i.e., phase difference) is selected in accordance with the reliability. On the other hand, in the second embodiment, correlation computation that is to be executed is selected before performing correlation computation from among multiple correlation computations, thereby enabling a larger amount of computation to be reduced than in the first embodiment. Note that since FIGS. 1 to 7 described in the first embodiment are common to the second embodiment, a description thereof will be omitted.

Figure 11:
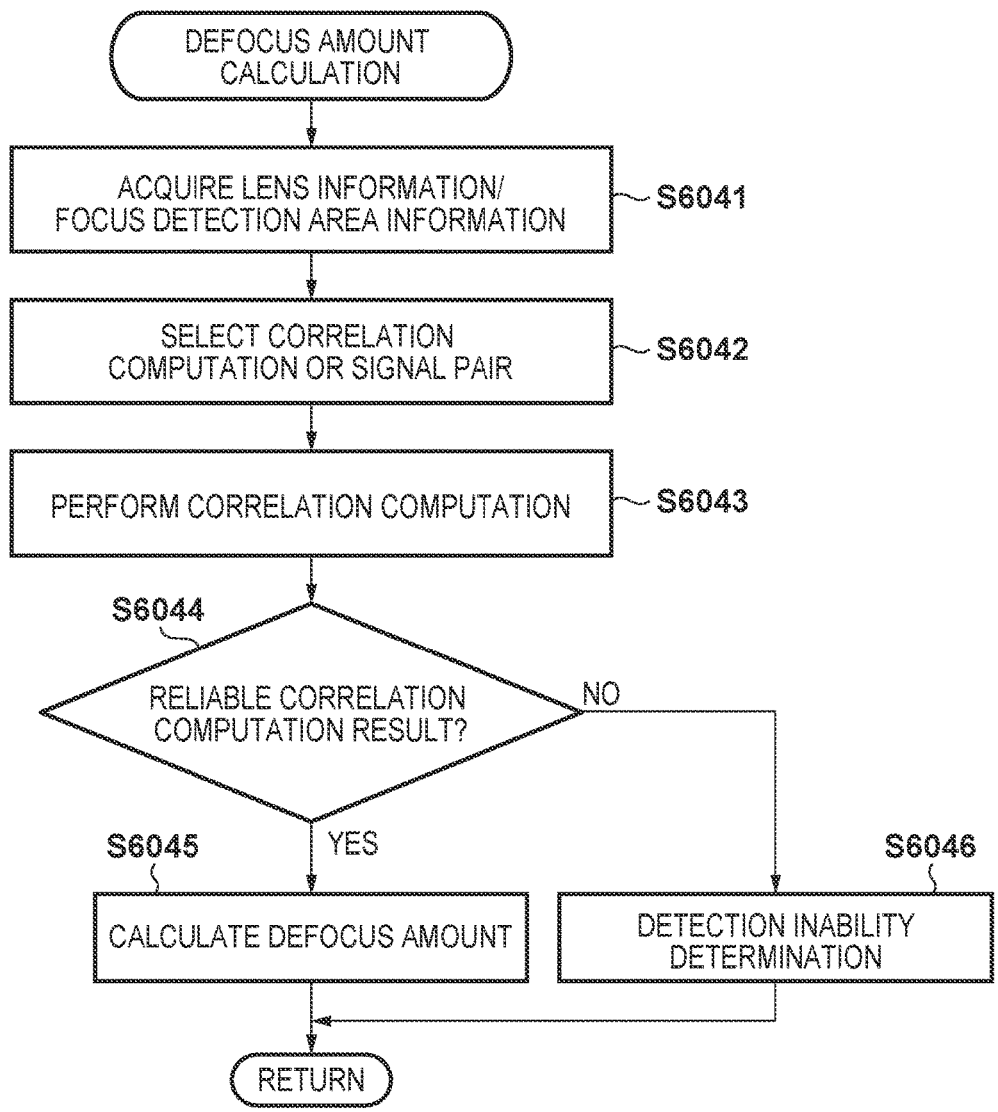
FIG. 11 is a flowchart for illustrating defocus amount calculation processing according to a second embodiment.

FIG. 11 is a flowchart showing defocus amount calculation processing performed by the phase-difference AF unit 129 according to the second embodiment.

In step S6041, the phase-difference AF unit 129 acquires lens information from the RAM 125b of the camera MPU 125, for example. The lens information is information that the camera MPU 125 acquires through the lens MPU 117 in step S502, for example, and is information regarding the F-number of the lens unit 110, the amount of correction of a focus detection result, the area in which the focus adjustment can be performed (maximum defocus amount), and the like. The camera MPU 125 acquires the lens information from the lens MPU 117 when, for example, starting the digital camera 100 and when replacing the lens unit 110, and stores the lens information in a predetermined area of the RAM 125b, for example. The phase-difference AF unit 129 acquires focus detection area information. The focus detection area information is information regarding the position of the currently set focus detection area (image height), and can be acquired from the RAM 125b of the camera MPU 125 or the internal memory of the phase-difference AF unit 129.

Next, in step S6042, the phase-difference AF unit 129 selects or determines the correlation computation that is to be executed (or a signal pair for which the correlation computation is to be performed). In the second embodiment as well, similarly to the first embodiment, correlation computation with different detectable defocus ranges and focus detection accuracy can be performed, but the phase-difference AF unit 129 executes the correlation computation for the specific signal pair that is selected based on the information acquired in step S6041. It is thereby possible to reduce the amount of correlation computation required for detecting the defocus amount.

For example, the larger the F-number of the optical system is, the smaller the baseline length of the signal used in focus detection is, and therefore, the sensitivity used for calculating the defocus amount from the phase difference (shift amount dh) obtained in the correlation computation increases. The larger the sensitivity is, the wider the detectable range for the same area of the shift amount is. Therefore, for example, if the F-number of the acquired lens information is larger than or equal to a predetermined value, the phase-difference AF unit 129 determines that accurate defocus detection can be performed in a wide area only with the second correlation computation, and can execute only the second correlation computation. Note that since the sensitivity changes due to not only the F-number but also the image height of the focus detection area, a configuration may also be employed in which it is determined that only the second correlation computation is to be executed if not only the F-number but also the image height satisfy a predetermined condition. The phase-difference AF unit 129 can also determine to execute only the second correlation computation when the maximum defocus amount of the photographic lens is smaller than a predetermined amount and can be dealt with only with the second correlation computation.

On the other hand, if the amount of correction of the focus detection result is small, it indicates that the aberration of the optical system is small. Accordingly, if, for example, the magnitude of the correction amount indicates that the aberration of the optical system is small to a degree to which the focus detection accuracies which can be respectively expected regarding the first correlation computation and the second correlation computation are roughly equal, the phase-difference AF unit 129 can determine to execute only the first correlation computation.

Note that the correlation computation that is to be executed may be selected based on information other than the lens information and the focus detection area information. For example, the phase-difference AF unit 129 acquires information regarding the current subject brightness from the camera MPU 125, and if the average brightness is smaller than a given value, the phase-difference AF unit 129 can determine that the S/N ratio of the image is not good due to a low illuminance environment, and determine to execute only the first correlation computation.

In step S6043, the phase-difference AF unit 129 performs the correlation computation for the selected or determined signal pair as performed in steps S5041 and S5042 in the first embodiment. In step S6044, the phase-difference AF unit 129 determines whether or not the correlation computation result is reliable (i.e., the reliability is high) as performed in S5043 and S5044. If it is determined that the correlation computation result is reliable, the phase-difference AF unit 129 advances the processing to step S6045, calculates the defocus amount from the correlation computation result similarly to steps S5045 and S5046 in the first embodiment, outputs the calculated defocus amount to the camera MPU 125, and ends the processing.

On the other hand, if it is determined in step S6044 that the correlation computation result is not reliable (i.e., the reliability is low), the phase-difference AF unit 129 advances the processing to step S6046, determines that the focus detection is impossible similarly to step S5047 in the first embodiment, and notifies the camera MPU 125 of this determination.

According to this embodiment, one of multiple correlation computations with different detectable defocus range and focus detection accuracies is selected and executed, and the defocus amount is detected based on the result of the executed correlation computation. Therefore, the same effects as those of the first embodiment can be achieved with a smaller amount of computation.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments.

This application claims the benefit of Japanese Patent Application No. 2015-152694, filed on Jul. 31, 2015, which is hereby incorporated by reference herein in its entirety.

What is claimed is:

1. An image capture apparatus comprising:
   a generating unit configured to generate a plurality of pairs of image signals based on a signal obtained from an image sensor;
   a phase difference determination unit configured to determine, for each one of the plurality of pairs of image signals, a phase difference of the image signals based on a correlation amount calculated while relatively shifting positions of image signals constitute the pair of image signals;
   a calculating unit configured to calculate a defocus amount based on the phase differences determined by the phase difference determination unit; and
   a control unit configured to control a position of a focusing lens based on the defocus amount,
   wherein the generating unit is arranged to generate, as the plurality of pairs of image signals, a plurality of signal pairs having different detectable defocus amount ranges and different defocus amount detection accuracies, and wherein the phase difference determination unit determines the phase difference, for each of the plurality of pairs of image signals, by setting a maximum shift amount and an area for each of the plurality of pairs of image signals, and computing the correlation amount for each of the plurality of pairs of image signals for the set area, the area being set for each of the plurality of pairs of image signals so that each area is to correspond to a substantially same area on the image sensor.

2. The image capture apparatus according to claim 1, further comprising:

an evaluation unit configured to evaluate the reliability of the phase differences, wherein the calculating unit is arranged to calculate the defocus amount based on one of a plurality of the phase differences determined by the phase difference determination unit, the one of the plurality of the phase differences being selected based on its reliability.

3. The image capture apparatus according to claim 1, wherein the generating unit is arranged to generate the plurality of pairs of image signals by compressing a data volume of one pair of image signals obtained from the image sensor, at different compression rates.

4. The image capture apparatus according to claim 1, wherein the phase difference determination unit sets the maximum shift amount and the area such that a ratio of the maximum phase difference in the area increases as the compression rate of an image signal increases.

5. An image capture apparatus comprising:

a generating unit configured to generate a plurality of pairs of image signals based on a signal obtained from an image sensor, a phase difference determination unit configured to determine, for each one of the plurality of pairs of image signals, a phase difference of the image signals based on a correlation amount calculated while relatively shifting positions of image signals constitute the pair of image signals;

a calculating unit configured to calculate a defocus amount based on the phase differences determined by the phase difference determination unit; and a control unit configured to control a position of a focusing lens based on the defocus amount, wherein the generating unit is configured to generate the plurality of pairs of image signals by compressing a data volume of one pair of image signals obtained from the image sensor, at different compression rates, and wherein the phase difference determination unit determines the phase difference, for each of the plurality of pairs of image signals, by setting a maximum shift amount and an area for each of the plurality of pairs of image signals, and computing the correlation amount for each of the plurality of pairs of image signals for the set area, the area being set for each of the plurality of pairs of image signals so that each area is to correspond to a substantially same area on the image sensor.

6. A method for controlling an image capture apparatus, the method comprising:

generating a plurality of pairs of image signals based on a signal obtained from an image sensor;

determining, for each of the plurality of pairs of image signals, a phase difference of the image signals based on a correlation amount computed while relatively shifting positions of image signals constitute the pair of image signals;

calculating a defocus amount based on the determined phase differences; and controlling a position of a focusing lens based on the defocus amount, wherein in the generating, the plurality of pairs of image signals are generated as a plurality of signal pairs having a different detectable defocus amount ranges and different defocus amount detection accuracies, and wherein in the determining, the phase difference, for each of the plurality of pairs of image signals, is determined by setting a maximum shift amount and an area for each of the plurality of pairs of image signals, and computing the correlation amount for each of the plurality of pairs of image signals for the set area, the area being set for each of the plurality of pairs of image signals so that each area is to correspond to a substantially same area on the image sensor.

7. A method for controlling an image capture apparatus, the method comprising:

generating a plurality of pairs of image signals based on a signal obtained from an image sensor;

determining, for each of the plurality of pairs of image signals, a phase difference of the image signals based on a correlation amount computed while relatively shifting positions of image signals constitute the pair of image signals;

calculating a defocus amount based on the determined phase differences; and controlling a position of a focusing lens based on the defocus amount, wherein in the generating, the pairs of image signals are generated by compressing a data volume of one pair of image signals obtained from the image sensor, at different compression rates, and wherein in the determining, the phase difference, for each of the plurality of pairs of the image signals, is determined by setting a maximum shift amount and an area for each of the plurality of pairs of image signals, and computing the correlation amount for each of the plurality of pairs of image signal for the set area, the area being set for each of the plurality of pairs of image signals so that each area is to correspond to a substantially same area on the image sensor.

8. An image capture apparatus comprising:

one or more processors;

a memory that stores a program executable by the one or more processors, wherein the program causes, when executed by the one or more processors, the one or more processors to function as:

a generating unit configured to generate a plurality of pairs of image signals based on a signal obtained from an image sensor, a phase difference determination unit configured to determine, for each one of the plurality of pairs of image signals, a phase difference of the image signals based on a correlation amount calculated while relatively shifting positions of image signals constitute the pair of image signals;

a calculating unit configured to calculate a defocus amount based on the phase differences determined by the phase difference determination unit; and a control unit configured to control a position of a focusing lens based on the defocus amount, wherein the generating unit is arranged to generate, as the plurality of pairs of image signals, a plurality of signal pairs having different detectable defocus amount ranges and different defocus amount detection accuracies, and wherein the phase difference determination unit determines the phase difference, for each of the plurality of pairs of the image signals, by setting a maximum shift amount and an area for each of the plurality of pairs of image signals, and computing the correlation amount for each of the plurality of pairs of image signals for the set area, the area being set for each of the plurality of pairs of image signals so that each area is to correspond to a substantially same area on the image sensor.

9. An image capture apparatus comprising:

one or more processors;

a memory that stores a program executable by the one or more processors, wherein the program causes, when executed by the one or more processors, the one or more processors to function as:

a generating unit configured to generate a plurality of pairs of image signals based on a signal obtained from an image sensor;

a phase difference determination unit configured to determine, for each one of the plurality of pairs of image signals, a phase difference of the image signals based on a correlation amount calculated while relatively shifting positions of image signals constitute the pair of image signals;

a calculating unit configured to calculate a defocus amount based on the phase differences determined by the phase difference determination unit; and a control unit configured to control a position of a focusing lens based on the defocus amount, wherein the generating unit is configured to generate the plurality of pairs of image signals by compressing a data volume of one pair of image signals obtained from the image sensor, at different compression rates, and wherein the phase difference determination unit determines the phase difference, for each of the plurality of pairs of the image signals, by setting a maximum shift amount and an area for each of the plurality of pairs of image signals, and computing the correlation amount for each of the plurality of pairs of image signals for the set area, the area being set for each of the plurality of pairs of image signals so that each area is to correspond to a substantially same area on the image sensor.

* * * * *